United States Patent
Hermann

(10) Patent No.: US 7,480,094 B2
(45) Date of Patent: Jan. 20, 2009

(54) ARRANGEMENT FOR SWITCHING THE OPERATING MODES OF A MICROSCOPE TUBE

(75) Inventor: Andreas Hermann, Gleichen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 105 days.

(21) Appl. No.: 11/240,266

(22) Filed: Sep. 30, 2005

(65) Prior Publication Data
US 2006/0082870 A1   Apr. 20, 2006

(30) Foreign Application Priority Data
Oct. 1, 2004   (DE)   ........................ 10 2004 048 296

(51) Int. Cl.
G02B 21/36   (2006.01)
G02B 27/10   (2006.01)

(52) U.S. Cl. ........................ 359/381; 359/636

(58) Field of Classification Search ................ 359/381, 359/629, 363, 368, 636
See application file for complete search history.

(56) References Cited

U.S. PATENT DOCUMENTS

| | | | | |
|---|---|---|---|---|
| 4,518,230 A | * | 5/1985 | Weber | ........................ 359/375 |
| 4,639,098 A | * | 1/1987 | Aoyama et al. | ............. 359/381 |
| 5,764,408 A | * | 6/1998 | Otaki | .......................... 359/368 |
| 6,088,155 A | * | 7/2000 | Tandler et al. | ............. 359/381 |
| 2004/0190128 A1 | * | 9/2004 | Hund et al. | .................. 359/368 |

FOREIGN PATENT DOCUMENTS

DE   10300455 A1 *   7/2004

* cited by examiner

*Primary Examiner*—Arnel C Lavarias
*Assistant Examiner*—Mark Consilvio
(74) *Attorney, Agent, or Firm*—Reed Smith LLP

(57) ABSTRACT

An arrangement for switching the operating modes of a microscope tube between the observation position, photo position and simultaneous observation/photo position. A prism is used having surfaces of different transparency which can be moved selectively into the beam path.

6 Claims, 4 Drawing Sheets

ARRANGEMENT FOR SWITCHING THE OPERATING MODES OF A MICROSCOPE TUBE

CROSS REFERENCE TO RELATED APPLICATION

This application claims priority of German Application No. 10 2004 048 296.9, filed Oct. 1, 2004, the complete disclosure of which is hereby incorporated by reference.

BACKGROUND OF THE INVENTION a) Field of the Invention

The invention relates to microscope tubes for switchable binocular observation and photographic recording or connection to video cameras. Such microscope tubes are often constructed with only two possible switching positions. This is because of the required tube width which is usually already equal to three prism widths when there are two switching positions and to approximately five prism widths when there are three switching positions. Assuming a prism width of 30 mm, this means that the width space requirement is 150 mm. However, many applications require 100-percent observation, 100-percent photography and a determined divider ratio between the two operating modes for simultaneous availability of both binocular beam paths being available simultaneously.

b) Description of the Related Art

In U.S. Pat. No. 2,910,913, a continuous beam path, a partially reflecting prism and a fully reflecting prism are arranged side by side in an arrangement that is very wide spatially. This arrangement is not very advantageous in terms of appearance, space requirement and material. In addition, a wider tube restricts accessibility and visibility of other controls on the microscope.

EP 85317 A1 describes a slide which can be switched to three positions and which moves a prism into the beam path; this also has a disadvantageous effect on the tube width.

DE 3636616 A1 provides two prisms and a switchable mirror which must be driven in a relatively complicated manner by separate drive units.

DE 3318011 C2 is directed to an auxiliary device for stereo microscopes with controls in a plurality of planes and different, complicated guide means.

Utility Model DE 8712342 U1 contains a prism slide which is only displaceable between two positions.

U.S. Pat. No. 4,685,776 provides three prisms adjacent to one another in the beam path for realizing the visual function, photo function, and joint visual/photo function. In this case also, there is a space requirement of five prism widths when switching, which restricts handling and takes away space that could be used for other additions.

Reference is had to the entire disclosure of DE 196 22 357, which provides a solution having two prisms which are individually displaceable relative to one another and, in addition, a compensating plate. While this solution requires only three prism widths for the three switching positions, its construction is mechanically complicated because of the two individually displaceable prisms and the compensating plate that is needed for adapting to the different glass paths. Further, switching generally requires that two actuating elements be moved; that is, both hands must be used.

OBJECT AND SUMMARY OF THE INVENTION

It is the primary object of the invention to provide a device for switching between the three operating modes—visual mode, photo mode, and visual/photo mode—which saves space but which is nevertheless constructed in a simple manner and is easy to operate.

According to the invention, an arrangement for switching the operating modes of a microscope tube between the observation position, the recording position and the simultaneous observation recording position comprises a first prism and a second prism that is preferably cemented to the first prism. The first prism has, on its side facing the second prism, surfaces of different transparency for the beam coming from the microscope objective. At least one operating control is provided which can alternately move one of these surfaces of different transparency into the beam path coming from the microscope objective.

In the solution according to the invention likewise, only three prism widths are required. The two prisms which are cemented together need only have one operating control. Therefore, only one actuation is needed for switching between the three operating modes. Further, it is particularly advantageous that the number of prisms is reduced so that the prisms, which are introduced into the beam path one after the other in the prior art, need no longer be adjusted relative to one another in a time-consuming manner.

The invention is described more fully in the following with reference to the schematic drawings.

DESCRIPTION OF THE PREFERRED EMBODIMENTS

Figure 1A:
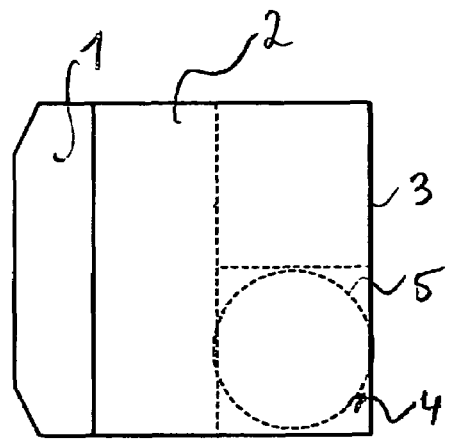
FIGS. 1a-b show the beam path for the binocular operating mode.

FIG. 1a shows a schematic top view of a prism 1 which is constructed as a Bauernfeind prism. At its upper side, the prism has surfaces 2, 3 and 4 having different coatings. Surface 2 is constructed so as to be transparent for the beam coming from a microscope objective, not shown, via a tube lens 5, while surface 3 is partly reflecting and surface 4 is fully reflecting. The prism 1 is positioned by means of operating controls, not shown, in such a way that the beam coming from the tube lens 5 is completely reflected by the fully reflecting surface 4.

Figure 1B:
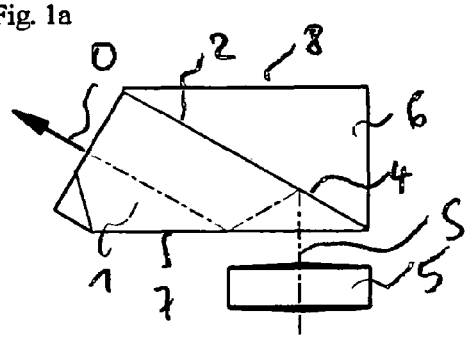

FIG. 1b shows the resulting microscope beam path S which realizes the binocular operating mode. A second prism 6 is cemented to the Bauernfeind prism 1 in such a way that the bottom surface 7 of the Bauernfeind prism 1 and the top surface 8 of the second prism extend parallel to one another and the surfaces 2, 3 and 4 are between the Bauemfeind prism 1 and the second prism 6. The beam path S reaches the fully reflecting surface 4 from an objective, not shown, through the tube lens 5, is reflected at the fully reflecting surface 4 and is guided, via a second reflection at the bottom surface 7, in direction of the eyepieces (arrow O), not shown.

Figure 2A:
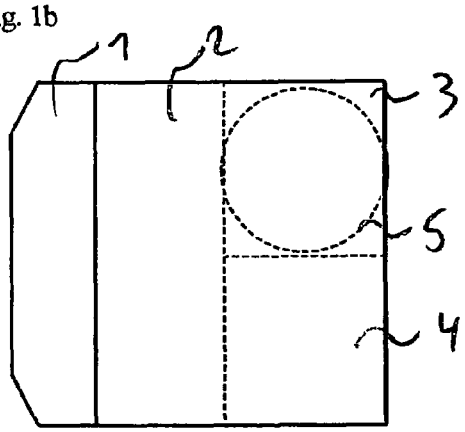
FIGS. 2a-b show the beam path for the binocular/photo operating mode.
Figure 2B:
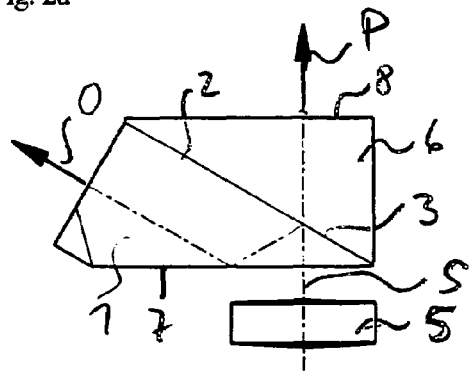

FIG. 2a again shows the Bauemfeind prism 1 with surfaces 2, 3 and 4 having different transparency. The prism 1 is now positioned in such a way that the beam coming from the tube lens 5 impinges on the partly reflecting surface 3. This partial reflection preferably allows a division of 50% reflection and 50% transmission for this beam. Accordingly, as is shown in FIG. 2b, a portion of the beam is reflected at surface 3 in the direction of the bottom surface 7 and is therefore guided in the direction of the eyepieces (arrow O), another portion of the beam passes through surface 3 and goes in the direction of a phototube, not shown (arrow P). Therefore, this position of the prism 1 realizes the binocular/photo operating mode.

Figure 3A:
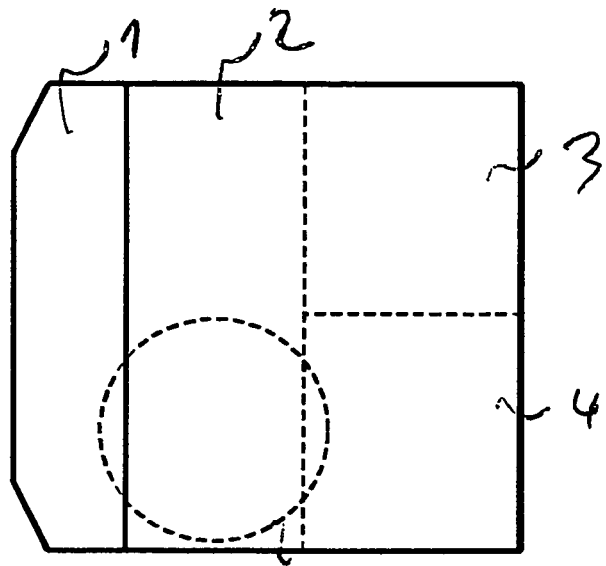
FIGS. 3a-c show the beam path for the photo operating mode.
Figure 3B:
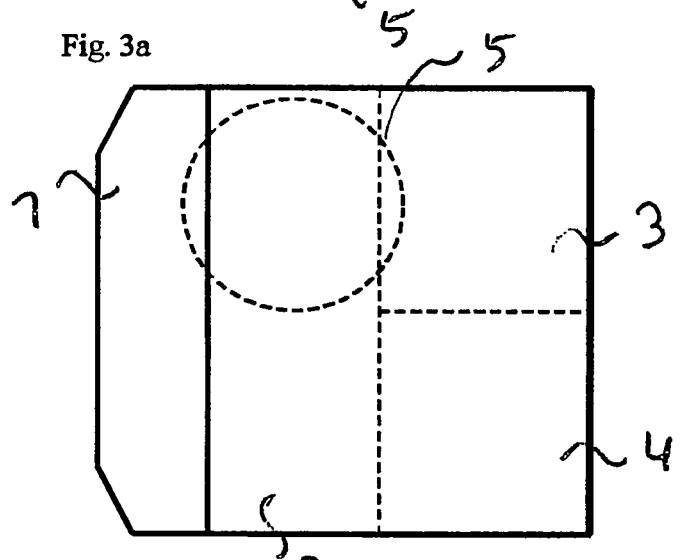
Figure 3C:
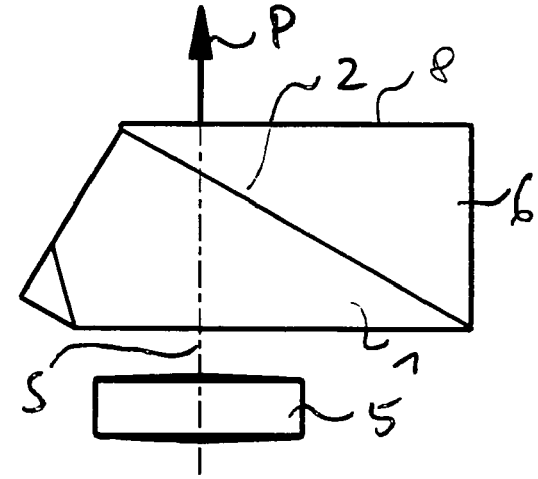

FIGS. 3a and b again show the Bauernfeind prism 1 with the surfaces 2, 3 and 4 having different transparency. In this case, the prism 1 is positioned in such a way that the beam coming from the tube lens 5 impinges on the transparent surface 2 and is therefore passed in direction of the phototube, not shown, without reflection (arrow P, photo mode). This is shown schematically in FIG. 3c. Since the transparent surface 2 shares an edge in common with the two surfaces 3 and 4, it is possible to switch from the binocular mode and the binocular/photo mode to the photo mode without an intermediate step. The positions of the prism 1 shown in FIGS. 3a and 3b are therefore equivalent.

Figure 4A:
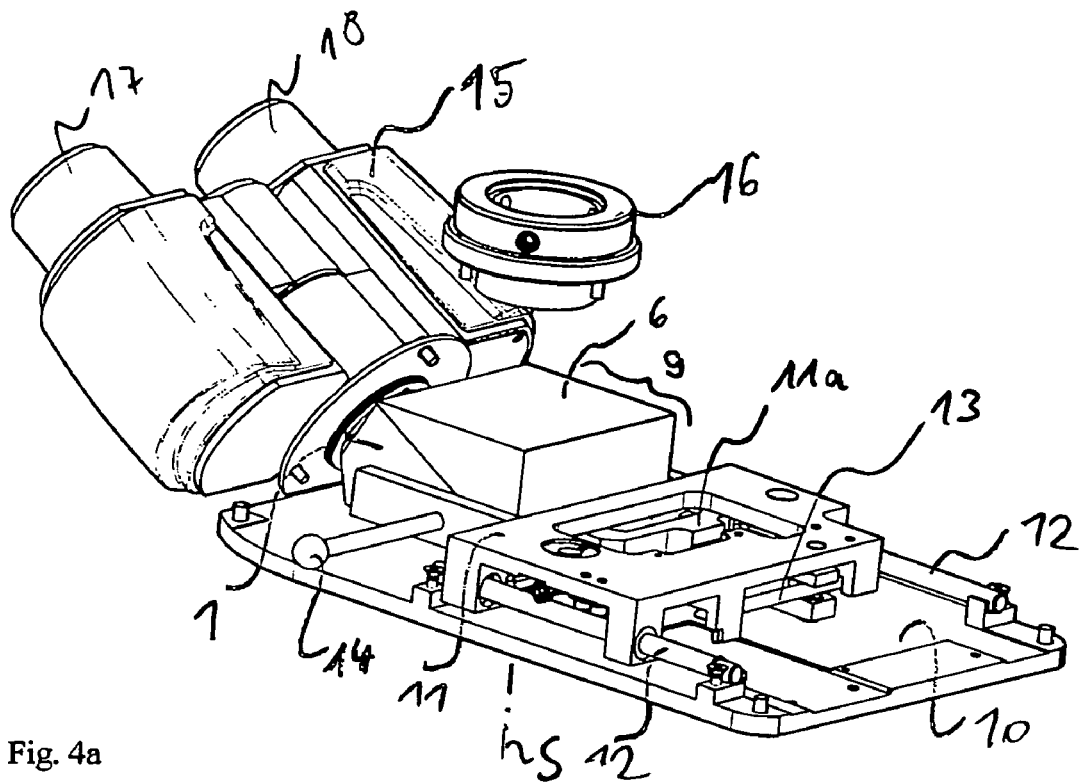
FIGS. 4a-c show perspective views in the three operating modes.
Figure 4B:
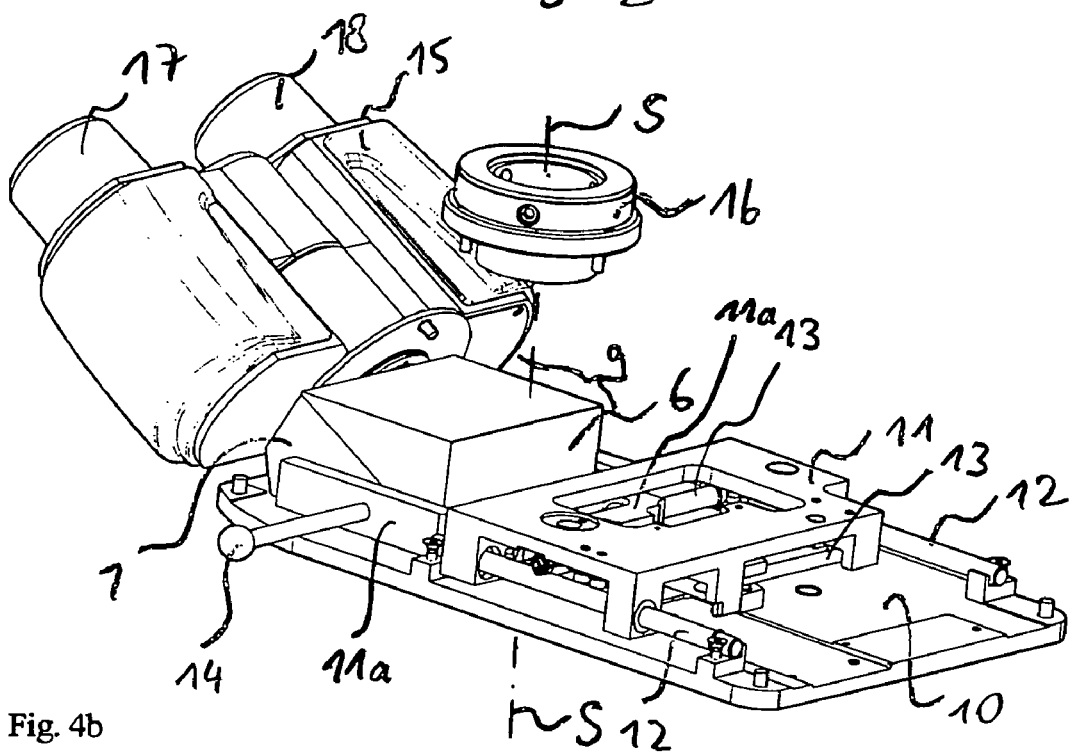
Figure 4C:
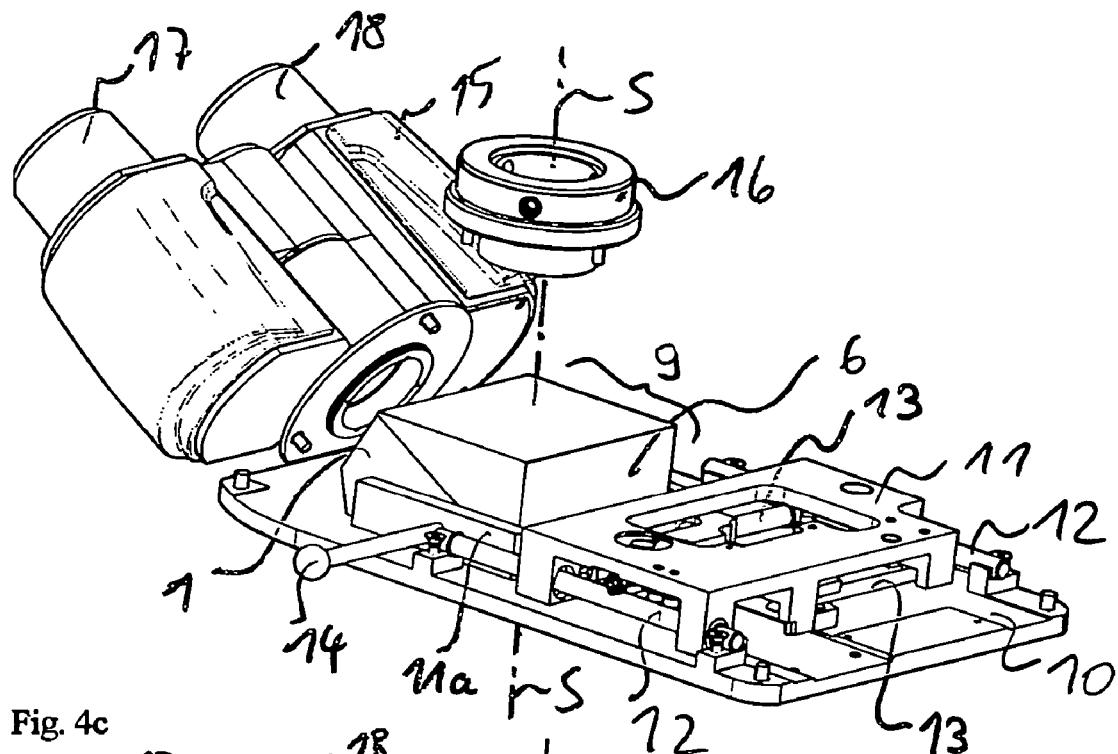

FIGS. 4a to 4c are perspective views showing the cemented component 9 comprising prisms 1 and 6 in the three operating modes. Two slides 11, 11a are arranged on a bottom plate 10 so as to be displaceable in two directions via guides 12, 13. The cemented component 9 is fastened to the slide 11a and can be moved by means of an operating control 14 together with the slide 11a between positions 3-4 and with slide 11 between positions 2-3 or positions 2-4. Positions 2, 3 and 4 correspond to the positioning of surfaces 2, 3 and 4 shown in FIGS. 1a, 2a, 3a, 3b in the beam path from the tube lens 5. This structural component parts are components of a tube (not shown) which is preferably exchangeable, the binocular portion 15 and the phototube 16 being fastened to this tube.

In FIG. 4a, the slide 11 is in its front position facing the binocular portion 15 and the cemented component 9 is positioned by means of slide 11a in such a way that the fully reflecting surface 4 (not shown) is in the beam path S (operating control 14 fully pushed in). Therefore, the entire beam is guided from the tube lens, not shown, in the direction of the eyepieces 17, 18 of the binocular portion (binocular mode).

In FIG. 4b, the slide 11 is still located in its front position. The operating control 14 is now pulled out and the slide 11a is accordingly moved into its second position in a corresponding manner. Consequently, the partially reflecting surface 3 (not shown) is located in the beam path S. A portion of the beam is therefore directed into the eyepieces 17, 18 and the other portion is directed to the phototube 16 (binocular/photo mode).

In FIG. 4c, the slide 11 has been pushed into its rear position by means of the operating control 14. Accordingly, the transparent surface 2 (not shown) is located in the beam path S regardless of whether or not the operating control 14 is pushed in. As was already described with reference to FIG. 3, the entire beam goes to the phototube 16 (photo mode).

Figure 5:
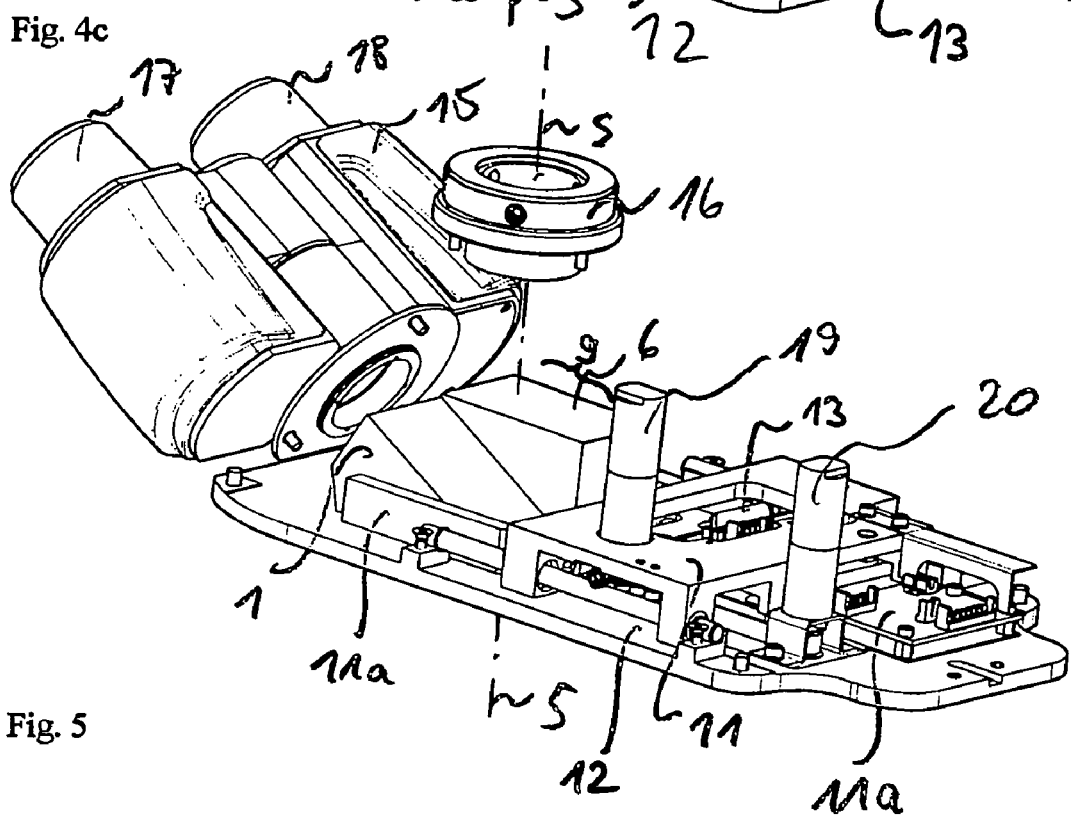
FIG. 5 shows a perspective view of a second embodiment form.

FIG. 5 shows a power-operated embodiment form of the invention. The slides 11, 11a are moved in both directions by motors 19, 20 which are controlled by an electronics unit, not shown. In contrast to the first embodiment form, the second prism 6 is constructed in such a way that it does not extend over the entire upper surface of the prism 1, but rather only over the half having the partially transparent surface 3. Because of the motor-operated control, the state shown in FIG. 3b is always started with in the photo mode; the characteristic of the inventive solution that is advantageous for manual operation, i.e., to be able to switch between operating modes with only one movement, can be dispensed with, as can the prism over the fully reflecting surface 4.

The invention is not limited only to the embodiment form shown herein. In particular, the invention also comprises the variations common in the field with respect to the arrangement of the surfaces of different transparency, the guide slides, the slide guides, the optical elements used for switching and the fastening thereof and reversal of the observation beam path and recording beam path. Further, it can be advantageous with respect to coating to arrange surfaces 2 and 3 and surfaces 2 and 4 on their own prism and to cement the latter together. If necessary, it is also possible to leave an air gap between the first prism and second prism, that is, not to cement the two prisms together.

While the foregoing description and drawings represent the present invention, it will be obvious to those skilled in the art that various changes may be made therein without departing from the true spirit and scope of the present invention.

What is claimed is:

1. An arrangement for switching the operating modes of a microscope tube between the observation position, the recording position and the simultaneous observation and recording position, comprising:
    a first prism;
    a second prism that is cemented to the first prism;
    said first prism having, on its side facing the second prism, surfaces of different transparency for the beam coming from the microscope objective; and
    at least one operating control being provided which can alternately move one of these surfaces of different transparency by shifting the prisms in two orthogonal directions into the beam path coming from the microscope objective;
    wherein the at least one operating control actuates between three different operating modes.

2. The arrangement according to claim 1, wherein a first surface of said surfaces substantially fully reflects the beam coming from the microscope objective.

3. The arrangement according to claim 1, wherein a second surface of said surfaces partially reflects the beam coming from the microscope objective.

4. The arrangement according to claim 3, wherein said second surface particularly reflects the beam by 50%.

5. The arrangement according to claim 1, wherein a third surface of said surfaces is substantially transparent for the beam coming from the microscope objective.

6. The arrangement according to claim 4, wherein each of the three surfaces is arranged adjacent to the other two surfaces.

* * * * *